United States Patent [19]

L'Espérance et al.

[11] Patent Number: 4,620,401

[45] Date of Patent: Nov. 4, 1986

[54] STRUCTURAL ROD FOR REINFORCING CONCRETE MATERIAL

[75] Inventors: Chantal L'Espérance, Sherbrooke; Germain Bélanger, St. Germain de Grantham, both of Canada

[73] Assignee: Societe Nationale de l'Amiante, Quebec, Canada

[21] Appl. No.: 730,205

[22] Filed: May 3, 1985

[51] Int. Cl.⁴ .............................................. E04B 5/04
[52] U.S. Cl. .............................. 52/309.15; 52/309.17; 52/600; 52/737; 428/377; 428/294; 57/232
[58] Field of Search ........... 52/309.15, 309.16, 309.17, 52/737, 738, 739, 600, DIG. 7, 736; 428/377, 294; 57/217, 220, 221, 234, 232

[56] References Cited

U.S. PATENT DOCUMENTS

| | | | |
|---|---|---|---|
| 2,425,883 | 8/1947 | Jackson | 52/309.17 |
| 3,716,982 | 2/1973 | Morohashi et al. | 52/230 X |
| 3,916,592 | 11/1975 | Morohashi et al. | 52/736 X |
| 4,016,714 | 4/1977 | Crandall et al. | 57/234 |

*Primary Examiner*—Carl D. Friedman
*Attorney, Agent, or Firm*—Cushman, Darby & Cushman

[57] ABSTRACT

A structural rod for reinforcing a mass of concrete material is formed of a non-metallic non-electrically conductive cylindrical core composed of a plurality of fibers oriented in the longitudinal axis and bound to each other by a thermosetting resin; the rod also includes embossments formed of a plurality of continuous fibers helically wound on the core and impregnated with a thermosetting resin; these embossments define a mechanical anchorage with the concrete material.

12 Claims, 8 Drawing Figures

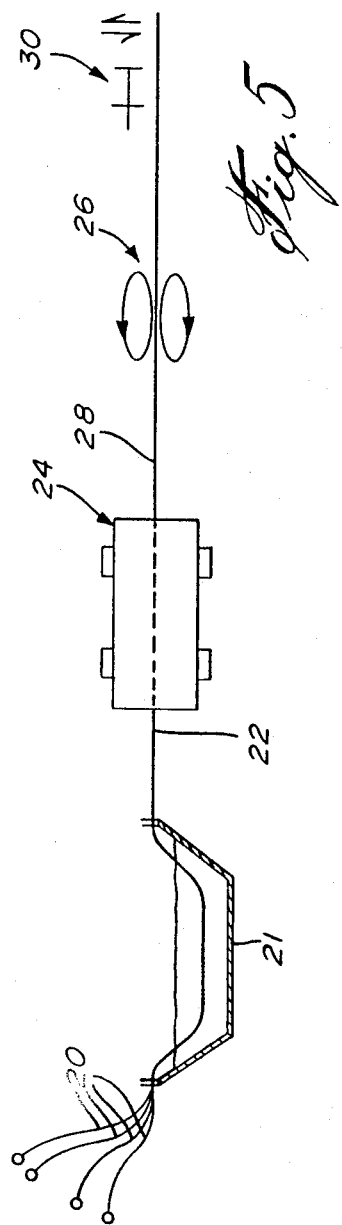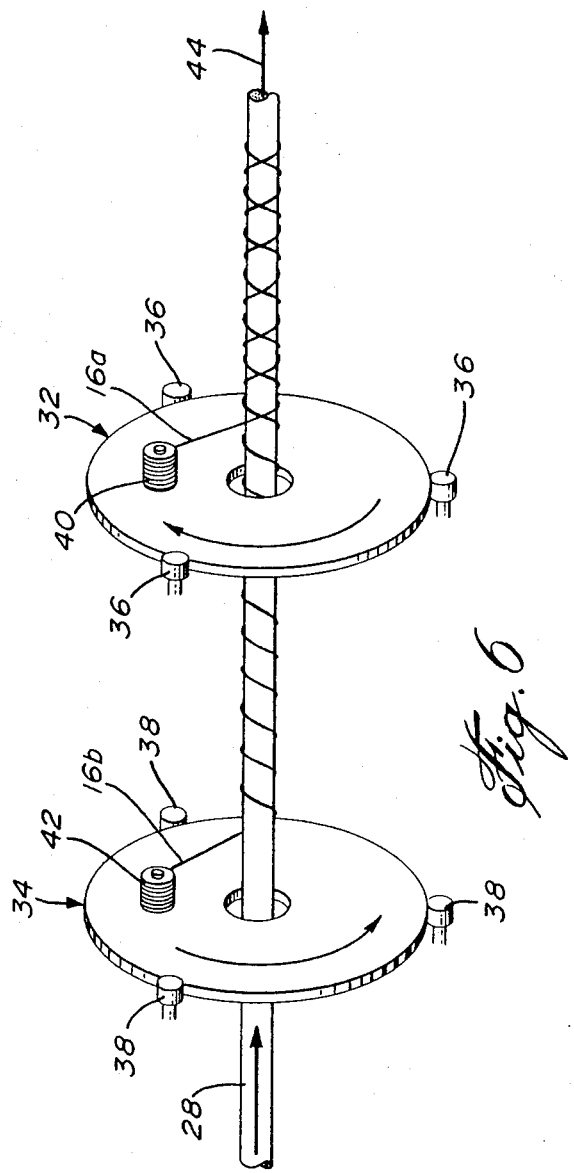

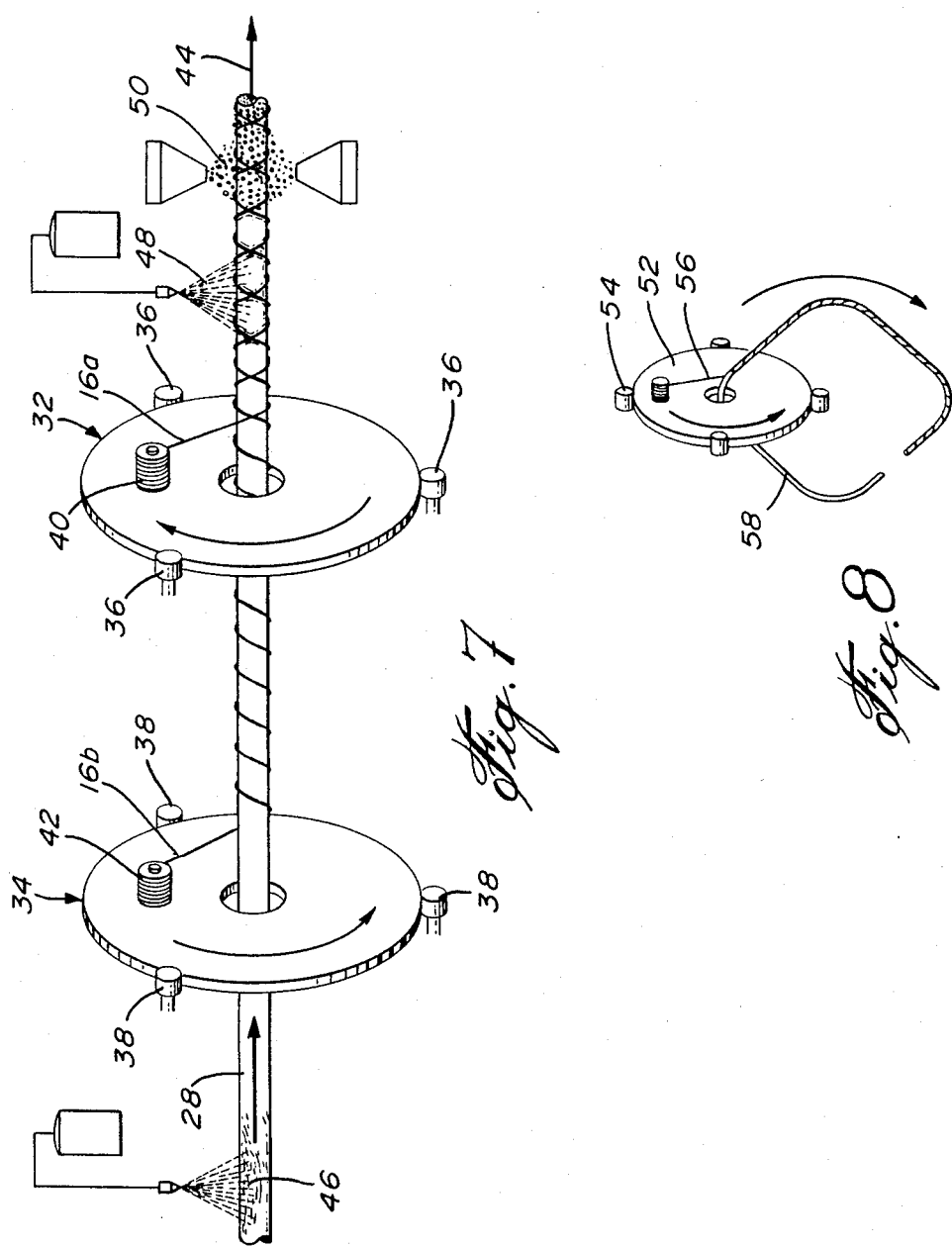

STRUCTURAL ROD FOR REINFORCING CONCRETE MATERIAL

BACKGROUND OF THE INVENTION

1. Field of the Invention

The present invention pertains to a structural rod for reinforcing a structural member, such as a mass of concrete material.

2. Description of the Prior Art

It is known to reinforce concrete structures by embedding therein rods or bars which are formed of closely adherent groups of fine glass fibers bounded together into a unitary structure; these rods are used as concentrated reinforcing members in the same manner as steel rods are used. Such reinforcing element may be found and described, for example, in U.S. Pat. No. 2,425,883 issued Aug. 19, 1947 to John G. Jackson. This patent describes a method for preventing slippage of the individual fibers forming the rod relative to each other and uneven stressing of certain of the strands. The method consists in grouping the strands together by a relatively inelastic bounding medium. Also, in order to increase the bond between the cement and the fibrous reinforcing member, the latter is deformed at spaced intervals along its length. This deformation is accomplished by pressing the resin impregnated fibers together into an intimate mass. There results a rod which has embossments of square section in those deformed areas. One disadvantage of such structural rod is that the pressing operation defeats the purpose of preventing uneven stressing of the individual fibers of the rod since the resulting geometry in fact creates an uneven distribution of forces in the rod. By producing a reinforcing element which has square-shaped embossments, a shearing occurs in the cementitious material at the periphery of the rod, especially in those regions having an angulation of 90°. Also the pressing operation requires a fixed station to perform such operation; this results in a repetitive sequence of stop-and-start to create embossments on the rod. If heat is required, time delay will be added to the molding process. The embossments will be of a weaker nature due to the absence of continuous fibers in such concentrated areas.

Also in the U.S. Pat. to Jackson, it is said that it is possible to have phenolic resin cured under heat after being incorporated in a concrete liquid mass which will harden before the polymer matrix. It has been found that it is impossible to cure uniformly phenolic resin after being immersed in liquid concrete due to the presence of water and humidity. Phenolic resin is sensible to water and humidity and such ambient medium results in an uneven undercured polymer matrix. Also, the presence of water and cement before polymerization of thermoset resin generates a chemical attack on the fiber-resin matrix interface resulting in a weaker strength and debonding.

SUMMARY OF THE INVENTION

It is an object of the present invention to provide a structural rod for reinforcing a mass of concrete material which rod is constituted of non-metallic continuous fibers bounded to each other by a thermosetting resin and polymerized in a geometrical profile which forms a mechanical anchorage with the mass of concrete material in which it is embedded.

The use of continuous filaments oriented substantially in their longitudinal axis provides maximum tensile strength for minimum weight. The rod thus formed maintains an elastic deformation until final rupture without being subjected to any plastic deformation (or creeping) under load conditions.

It is a further object of the present invention to provide a structural rod having maximum anchorage with the mass of concrete material. This is achieved by giving to the rod a profile obtained by the presence, on the core, of an helical winding formed of a plurality of continuous fibers. This geometrical profile results in the provision of embossments along the central core which define compression and shear stresses in the concrete when the rod is subjected to tensile, compressive or shearing loads; this is, indeed, contrary to the only shearing constraints which are particular to profiles of rods made of steel. The helix pitch of the filaments, as well as the diameter of the core of these filaments wound helically, may be modified to define various geometrical profiles in order to ensure maximum anchorage in different types of cement mixtures having varying sizes of aggregates. The possibility of modifying the pitch and the core diameter of the filaments helically to provide high depressions (outside diameter to inner diameter) in the rod profile allows the use of rods in areas where high thermic constraints exist; cement expansion adjacent the rod has little effect on the quality of its anchorage to the cement.

The present invention therefore relates to a structural rod for reinforcing a mass of concrete material which comprises, in its broadest aspect, a non-metallic cylindrical core composed of a plurality of continuous fibers oriented substantially in the longitudinal axis and bound to each other by a thermosetting resin; and embossment means on the core being formed of a plurality of continuous fibers helically wound around the core and impregnated with a thermosetting resin, the embossment means defining a mechanical anchorage bond with the concrete material when the rod is embedded in a mass of concrete material. The thermosetting resin achieves a strong bond between the core and the helically wound fibers to prevent relative movement therebetween. Such relative movement is highly undesirable in a structural rod which is to be embedded in a mass of concrete material.

In one form of the invention, the embossment means define a double helix fiber winding over the central core.

In another form of the invention, a layer of thermosetting resin envelops the core and the embossment means.

In another form of the invention, aggregates are randomly set in the topcoat layer of thermosetting resin to provide additional anchorage to the concrete.

Fibers which may be used with the present invention are fiberglass, graphite, carbon or aramide filaments; they can also be filaments of polypropylene or polyester material.

Other objects of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS:

For a better understanding of the present invention, reference is had to the following description taken in connection with the accompanying drawings in which:

FIG. 5 is a schematic diagram showing generally the process of making the cylindrical rod of the present invention;

FIG. 6 is a schematic representation of the means for providing a double helix on the core of the rod of the present invention;

FIG. 7 is a schematic representation similar to that shown in FIG. 6, but illustrating an additional feature of depositing aggregates on the rod being formed; and FIG. 8 is a schematic representation illustrating a method of providing a double helix on a non-linear rod.

Figure 1:
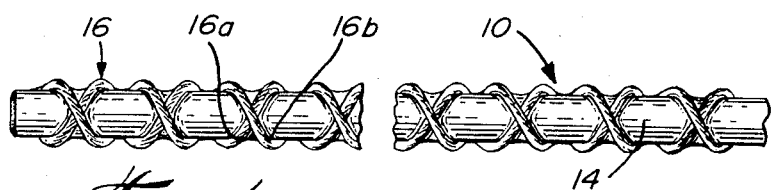
FIG. 1 is an elevational view of a rod made in accordance with the present invention, the rod being broken to show indefinite length.
Figure 2:
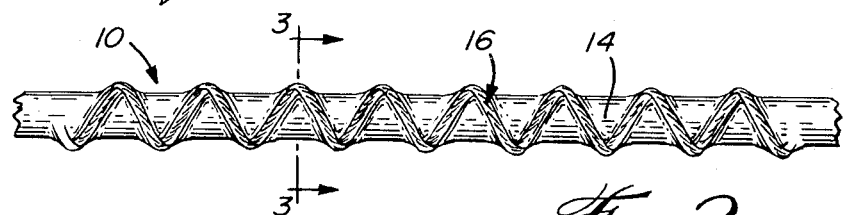
FIG. 2 is a view similar to that of FIG. 1 with the rod being rotated 90° about its longitudinal axis.
Figure 3:
FIG. 3 is a cross-sectional view of the rod taken along lines 3—3 of FIG. 2.
Figure 4:
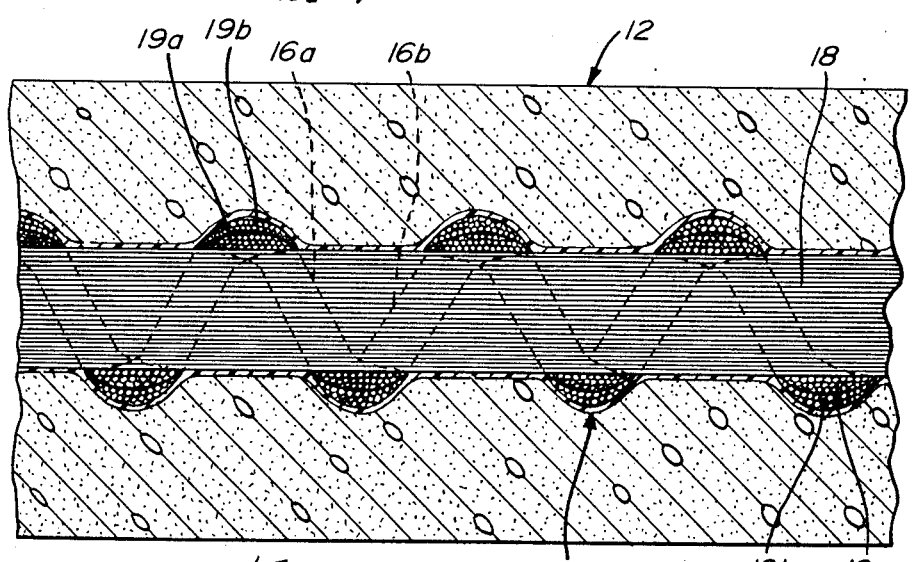
FIG. 4 is a cross-sectional view showing the rod embedded in a mass concrete material.

DESCRIPTION OF PREFERRED EMBODIMENTS:

Referring to FIGS. 1-4, there is shown a structural rod 10 adapted to be embedded in a mass of concrete material 12 and comprising a core 14 and embossments 16 formed by helical windings on the core 14.

The core 14 is cylindrical in shape and is composed of a plurality of elongated continuous fibers 18 substantially oriented in their longitudinal axis. These filaments are bound to each other by a thermosetting resin to prevent relative movements therebetween.

The embossments 16 result from the provision of a double helix 16a and 16b wound on the cylindrical core 14. Each helix formed consists of a plurality of elongated continuous fibers 19a and 19b, also impregnated with a thermosetting resin to prevent relative movements therebetween and also to form a strong bond between the helically wound fibers and the cylindrical core 14, thus preventing relative movement which is highly undesirable.

The rod 10 is thus formed of only two basic materials: fibers and resin.

One preferred form of continuous fibers used in the construction of rod 10 of the present invention is fiberglass; its filament is a hard and impervious substance and exhibits durability when exposed to corrosive materials and, more particularly, when the glass composition is of the type CR which is an E glass by definition in that it contains less than 1% alkali expressed as $Na_2O$; it has also exceptionally high tensile strength and elasticity with extremely low elongation.

Other filaments which may be used are those made of graphite, carbon, aramide (known under the trademark Kelvar) as well as filaments of polypropylene and of polyester. Combinations of these materials are also possible as desired solution will dictate the properties that are required for a given application of the rods used. The availability of a variety of filament fibers wherein each has different mechanical properties, combined to thermoset resin matrix having different hardness and flexibility in ratios (fiber/resin) that can vary, allows a manufacturer to make a rod with an elasticity module and a tensile resistance that can vary in accordance with the combination of fibers selected while maintaining the diameter at a fixed value. For example, the particular characteristics of organic fibers may be advantageously combined with those of glass to form a hybrid material having a high performance.

The selection of a helix pitch and of the diameter of the filament bundle wound helically on the core is determined by the type of concrete used and the basic rod diameter required. Generally, it has been noted that the pitch should vary between 0.5 and 1.5 times the nominal diameter of the rod in order to achieve an adequate concrete wetting during pouring. Furthermore, the pitch to be selected is a function of the diameter of the core rod.

The choice of a double helix is highly recommended in order to avoid the twisting effect created by a longitudinal tensile load. This twisting effect could result in "unscrewing" the rod inside its envelope. An advantageous way of nullifying this action is to form a double helix on the core to provide an equilibrium of the active forces.

Referring to FIG. 5, the first step in the method of making the rod of the present invention, consists in forming the cylindrical core 14 by pultrusion, which is a well known process for binding together filaments or rovings. Rovings 20 are first channeled through a resin bath 21 so as to be impregnated with resin in liquid form. The impregnated rovings 22 are then regrouped and oriented towards a heating mold 24 while being stretched longitudinally by means of a traction device 26. Inside the mold, the grouped rovings 22 are shaped to adopt the profile of the mold and, under its heating effect, the thermosetting resin solidifies to form a solid core 28. At the exit of the mold, the rod core 28 exits and, at station 30, may be cut to predetermined lengths.

The cylindrically shaped rod core 28 is now ready to receive an helical filament winding. The winding operation can be done separately or in a continuous manner as illustrated in FIG. 6. The winding device may be located at the exit of the pultrusion mold 24. Two rotating plates 32 (rotating clockwise) and 34 (rotating counterclockwise) are driven by wheels 36 and 38, respectively, and carry bobbins 40 and 42 of continuous bundled filaments 16a and 16b, respectively. These filaments 16a and 16b, respectively are wound on the core 26 moving longitudinally in the direction of arrow 44. This, arrangement thus provides a double helix on the core 28 due to their opposite rotational movements and to the longitudinal displacement of the core 28. As shown in FIG. 7, to secure the double helix windings on the core 28, it is preferred to wet the rod 28 with a thermosetting material 46 prior to winding, or the bobbins 40 and 42 could contain rovings which will harden under heat exposure after winding.

Evidently, the double helix could also be formed by a single winding which would be dispensed to the core 28 from a travelling carriage having a reciprocal motion relative to a rotating core 28, however fixed longitudinally.

After the winding operation, the polymerization of the resin is carried out and the rod 28 is ready for use.

However, to form a unitary structure and to obtain an additional corrosion barrier to the final product, it is preferred to envelop the core 28 and the embossments 16 formed thereon with a layer of thermosetting material 48 after the winding operations (see FIG. 7). As an additional feature, aggregates 50 may be dispensed on the thermosetting material 48 prior to setting to thereby provide additional anchorage to the rod 28 when embedded in concrete.

FIG. 8 shows a rotatable plate 52 carrying a bobbin 54 dispensing bundles filaments 56 onto a non-linear rod 58, the latter having a core constructed by the filament winding process on a profiled mandrel. Instead of pulling the filaments 56 impregnated with thermoset resin in a continuous mold, these wet filaments 56 are wound in a mandrel or mold having the shape of rod 58. After curing, the rod 58 is cut and demolded and a short section is removed to allow processing through the rotatable plate 52 in a two-step operation to complete the helical pattern. Hence, the present invention may be used to form structural elements of many shapes and sizes which are used as reinforcements in a mass of concrete material.

It is therefore wished to have it understood that the present invention may be refined and modified in various ways and should not be limited in interpretation except by the terms of the following claims.

We claim:

1. A structural rod for reinforcing a mass of concrete material comprising:
   (a) a non-metallic non-electrically conductive cylindrical core composed of a plurality of continuous fibers oriented substantially in the longitudinal axis and bound to one another by a thermosetting resin; and
   (b) embossment means on said core, being formed of a plurality of continuous fibers helically wound around said core and impregnated with a thermosetting resin;
   said thermosetting resin achieving a strong bond between the core and the fibers helically wound thereabout so as to prevent relative movement between said core and said embossment means:
   said embossment means defining a mechanical anchorage bond with concrete material when said rod is embedded in said mass of concrete material.

2. A structural rod as defined in claim 1 wherein said embossment means are formed of a double helix on said core.

3. A structural rod as defined in claim 2, wherein the angle of said helix with respect to the longitudinal axis of said cylindrical core is a function of the diameter of said core.

4. A structural rod as defined in claim 1, further comprising a layer of thermosetting resin enveloping said core and said embossment means.

5. A structural rod as defined in claim 1, wherein said fibers are fiberglass filaments.

6. A structural rod as defined in claim 1, wherein said fibers are graphite filaments.

7. A structural rod as defined in claim 1, wherein said fibers are carbon filaments.

8. A structural rod as defined in claim 1, wherein said fibers are aramide filaments.

9. A structural rod as defined in claim 1, wherein said fibers are made of polypropylene material.

10. A structural rod as defined in claim 1, wherein said fibers are made of polyester material.

11. A structural rod for reinforcing a mass of concrete material comprising:
    (a) a non-metallic non-electrically conductive cylindrical core composed of a plurality of continuous fibers oriented substantially in the longitudinal axis and bound to one another by a thermosetting resin; and
    (b) embossment means on said core, being formed of a plurality of continuous fibers helically wound around said core; and
    (c) a layer of thermosetting resin enveloping said core and said embossment means with aggregates randomly set in said layer of thermosetting resin;
    said embossment means defining a mechanical anchorage bond with concrete material when said rod is embedded in said mass of concrete material.

12. A reinforced structural member comprising a mass of concrete material and a series of structural rods embedded therein, each said rod comprising: (a) a non-metallic non-electrically conductive cylindrical core composed of a plurality of continuous fibers oriented in the longitudinal axis and bound to each other by a thermosetting resin; and (b) embossments on said core, being formed of a plurality of continuous fibers helically wound around said core and impregnated with a thermosetting resin to thereby form a mechanical bond with said mass of concrete material.

* * * * *

Notice of Adverse Decisions in Interference

In Interference No. 101,882, involving Patent No. 4,620,401, C. L. Esperance and G. Belanger, STRUCTURAL ROD FOR REINFORCING CONCRETE MATERIAL, final judgment adverse to the patentees was rendered Feb. 26, 1991, as to claims 1-10 and 12.
*(Official Gazette August 27, 1991)*